United States Patent [19]

Janay

[11] Patent Number: 5,687,385
[45] Date of Patent: Nov. 11, 1997

[54] DATA ENTRY USING LINKED LISTS

[75] Inventor: Gad Janay, Boca Raton, Fla.

[73] Assignee: EPI, New York, N.Y.

[21] Appl. No.: 457,260

[22] Filed: Jun. 1, 1995

[51] Int. Cl.[6] .................................................. G06F 15/62
[52] U.S. Cl. ........................ 395/767; 395/613; 395/601
[58] Field of Search ................................. 395/600, 601, 395/613, 616, 767

[56] References Cited

U.S. PATENT DOCUMENTS

| | | | |
|---|---|---|---|
| 4,318,184 | 3/1982 | Millet et al. | 364/900 |
| 4,591,983 | 5/1986 | Bennett et al. | 364/403 |
| 4,646,250 | 2/1987 | Childress | 364/518 |
| 4,763,277 | 8/1988 | Ashford et al. | 364/513 |
| 4,764,867 | 8/1988 | Hess | 364/200 |
| 5,115,501 | 5/1992 | Kerr | 395/600 |
| 5,222,236 | 6/1993 | Potash et al. | 395/600 |
| 5,228,123 | 7/1993 | Heckel | 395/155 |
| 5,260,883 | 11/1993 | Wilson | 364/512 |
| 5,367,619 | 11/1994 | Dipaolo et al. | 395/149 |
| 5,450,545 | 9/1995 | Martin et al. | 395/700 |

OTHER PUBLICATIONS

Kennitec, "Microsoft Windows User's Guide", pp. 16–40, Dec. 1992.

*Primary Examiner*—Thomas G. Black
*Assistant Examiner*—Donald Min
*Attorney, Agent, or Firm*—Jeffrey I. Kaplan, Esq.

[57] ABSTRACT

A technique for insuring the integrity of documents such as, for example, letters of credit, contracts, etc., wherein groups of possible entries are linked to one another. When an entry from a particular group is placed in a first field, it requires entry of an element from a particular other group in one or more other fields. By checking the entries in each field against entries in other fields, inconsistences are eliminated.

3 Claims, 3 Drawing Sheets

| FIELD 1 | FIELD 2 | FIELD 3 | FIELD 4 |
|---------|---------|---------|---------|
| A1 | B1 | E1 | G1 |
| A2 | B2 | E2 | G2 |
| A3 | B3 | E3 | G3 |
| A4 | B4 |    |    |
| A5 | B5 | F1 | H1 |
|    |    |    | H2 |
|    | D1 |    | H3 |
|    | D2 |    | H4 |

*FIG. 1*

DATA ENTRY USING LINKED LISTS

TECHNICAL FIELD

This invention relates to computer data entry, and more particularly, to an improved technique which ensures that data entered at a computer which is utilized to generate transaction records is correct and consistent.

BACKGROUND OF THE INVENTION

Computers are often used in today's society to generate a variety of business forms, many of which relate to or reflect business transactions. For example, computers may be used to generate receipts, purchase orders, or other transaction records. Typically, a user is required to enter one or more items of data into different fields, and the information is then utilized by the computer to generate one or more different business forms or transaction records. It is understood that for purposes of explanation herein, the terms "data" and "text" are both meant to be any type of information entered into the computer, including numerics, dates, character data, text, logical values (e.g.; true or false) etc.

In order to ensure that the correct data is entered into the appropriate fields, many computer programs include restricted fields. For example, if a particular field to be filled in by an operator is titled "location code", the field may be restricted to one of two values, each of which represents one of the two company locations. Other fields may be "masked", meaning that the data entry clerk either cannot alter the field, or cannot see it because it will not even be displayed.

While prior art systems provide some level of assurance that inappropriate data is not entered into particular fields, prior systems are not foolproof because they leave open the possibility of inconsistent and incorrect values being entered into various fields. Additionally, sometimes entry of specific data in a particular field requires a particular value or set of values to be entered in a second field. In other instances, entry of data into a particular field requires that a different field not have particular data, or not have any data at all. Another alternative might be that the absence of data in a particular field requires that a particular other field have certain data. All of this checking is left to the data entry clerk.

The above described problems are particularly troublesome in the financial community, where large sums of money are involved and complex legal documents must be generated. There exists no way of assuring that the above requirements are met. The best technique presently known is to simply invest in training the appropriate personnel to carefully check for errors. Not only does this require a relatively highly skilled, and therefore somewhat costly data entry clerk, but it is also subject to human errors.

For example, consider a letter of credit, issued by a bank and often used to effectuate payment to a seller in international transactions. The letter of credit may include, among other items, shipment terms. For any particular shipment terms, a set of further information may be required to be entered. If an insurance term is required, there may be specific types of insurance which either (i) must be present or (ii) must not be present. Moreover, the particular terms which either must be present or may not be present may depend upon other data entered into other fields, such as the particular customer, the particular shipment destination, etc.

Correct generation of a letter of credit and supporting conditions and documents is critical because the banking institution, which ultimately pays the seller, does so upon presentation of the proper documentation. The bank has no interest in, and little knowledge of, the actual commercial transaction taking place. Moreover, the bank will normally not be legally liable for any damages provided that it pays upon properly presented letter of credit documents. Thus, documents incorrectly generated can, and sometimes do, result in errors causing millions of dollars in losses.

There is no known technique to ensure that the proper information is entered on the letter of credit. Since most international transactions utilize letters of credit and often involve many millions of dollars, mistakes can be extremely costly. It is therefore desirable to provide a technique to improve the integrity of the data being entered to generate a letter of credit as well as to provide a system of ensuring that data entry is restricted to correct values, is consistent, etc.

SUMMARY OF THE INVENTION

The above and other problems of the prior art are overcome in accordance with the present invention which relates to the use of a hierarchical technique for linking text, data, etc. at different levels of a hierarchy to permissible values of data, text, etc. at other levels of the hierarchy. The data is entered into various "fields" of a database as these fields are presented to a user on the screen of a personal computer (PC). The data which can be entered into each field is predefined into different classifications (i.e; lists or groups). Depending upon which data is entered, a particular group of data is selected for entry into a different field. Once a group is selected, only an entry from that group can be entered into the corresponding fields.

The particular rules for selecting data from ech group are defined by the user using a menu. This allows the user to choose which phrases should and should not be entered into each field as a result of data entered in other fields. Thus, the set of rules is user definable, rather than being programmed in by the system designer. This greatly enhances flexibility and the user's ability to customize the system.

For example, field 1 can comprise any data from an exemplary group A (A1–A5). The entry of A1 into field 1 may require that field 2 include data from an exemplary group B, including entries B1–B5. Alternatively, entry into field 1 of the value A2 may trigger a requirement that field 2 be restricted to entries from group C, which includes elements C1–C8.

The technique takes advantage of the fact that most possible values to be entered into a field can be classified. The technique uses the entry of data into each field to select a group of values, one or more of which must be entered into other fields. Thus, the groups of elements form a system of linked lists, whereby entry into a field of a particular element from a particular list triggers a requirement that a different field must be filled in with data from a particular list, which list is determined by the entry into the first field.

The required element or entry may be the absence of any entry at all, the absence of a particular entry, or the presence of a particular one or more entries. Thus, entry of data into a particular field may require that a particular second field be blank.

In general, the system uses a hierarchy to classify text and data at each level of the hierarchy, and then uses the classification to ensure that there are no inconsistencies, duplicates, etc. The hierarchical classification is also used to tie together text with data, create audit trails, classify documents as well as a variety of other functions.

The system includes other enhancements to make it more user friendly which include maintenance of audit trails, creation of an "amalgamated" document incorporating the latest filled-in data, allowing for editing, deletion or addition of permissible phrases, and other analyses of the data.

The system's advanced functionality may provide one or more of the following capabilities: (i) classify text and data\or data (e.g.; numeric, date, character, etc.); (ii) tie text to data using a hierarchy structure; (iii) check for duplicates and\or mutual exclusivity; (iv) define specific questions, explanations, etc. to assist the user in filling in data into one or more fields; (v) display questions and answers to elicit the proper data to be filled in by the user (vi) save data filled into one screen for use in other screens and (vii) maintaining audit trails for system security.

A better understanding of the features and benefits of the present invention can be obtained by referring to the following detailed description and the drawings included herewith.

BRIEF DESCRIPTION OF THE DRAWINGS

FIG. 1 is a table showing different lists of data suitable for entry into one of four different fields from a database;

DETAILED DESCRIPTION OF THE PREFERRED EMBODIMENT

Figure 2:
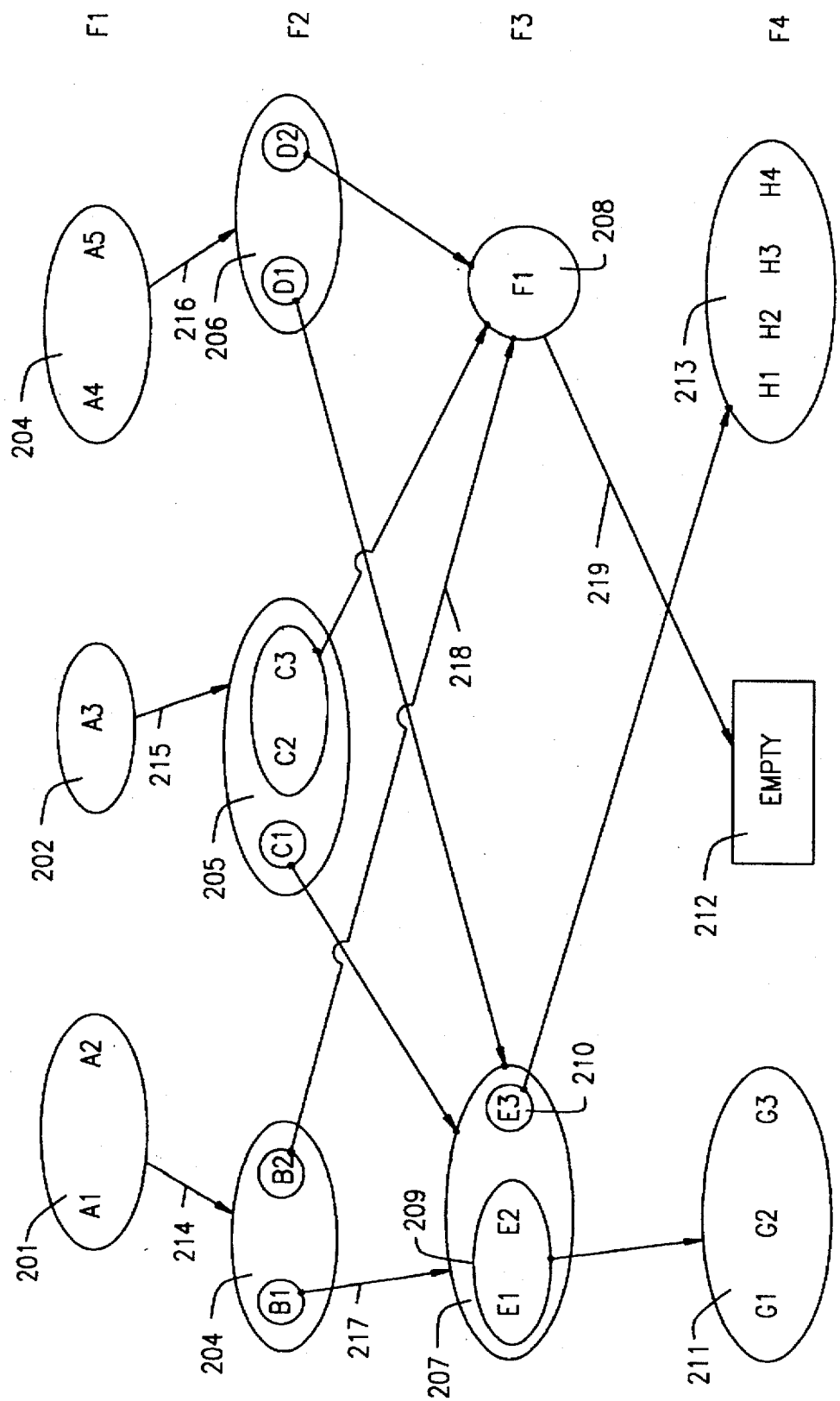
FIG. 2 is a logic diagram indicating how a set of linked lists may be used to ensure data accuracy.

FIG. 1 shows a system of four different tables, each of which represents data to be filled into fields 1–4, respectively, of a hypothetical data entry screen on a computer. Beneath each of fields 1–4 is a listing of possible data entries which are denoted A(n)–H(n), where n is a number ranging from 1–5. Each field represents an element of information to be entered into, for example, a database or other type of data structure.

The potential elements in the list A could be any type of information such as type of shipment, type of insurance, payment terms or any other information utilized in the generation of the business transaction form. Importantly, it is possible to define the list A1–A5 because in most data entry screens, the permissible choices for each field are both finite and ascertainable in advance.

As an example, we consider a situation where field 1 may comprise different types of letters of credit which are known to those in the financial industry. For each type of letter of credit, certain types of information may be required. Thus, if the letter of credit is a type 1 letter of credit, then it may require an insurance policy. The insurance policy may be selected from a group of five possible insurance policies.

If, on the other hand, the letter of credit is of type 2, then it does not require an insurance policy, but rather, requires transportation documents which indicate that the transportation fees must be collected. If the insurance documents are to be provided, then there may be a choice among the plurality of different insurance documents. These documents comprise a group from which the user must select a particular entry.

The system can be thought of as a hierarchy. At each "level" of the hierarchy text is classified into groups which are permitted to be entered into particular fields. At each level of the hierarchy, the data entered defines the next level of the hierarchy. The system then checks each level of the hierarchy for various items such as inconsistencies, mutual exclusivity (if required), duplicates, and other items to be more fully described hereafter.

By providing that each entry into any field requires that data entered into a different field be chosen from a particular group, the system minimizes errors. Reliance on human checking is minimized.

As an enhancement, the system can also deal with the requirement that information not be contained in particular fields. Specifically, if a particular type of insurance is selected, then the system will ensure that a particular field which relates to that insurance does not contain certain entries so that there are no inconsistencies in the document. By way of example, and referring to the chart of FIG. 1, the element F1 could be the null set. The system ensures that when a particular entry is placed into field 2, F1 is required to be in field 3. Since F1 is the null set, field 3 will be empty when F1 is required.

The technique can also ensure that there are no inconsistent terms. For example, consider first that the user enters Free on Board (FOB) as the shipment terms on the letter of credit and is then requested to fill in a shipment method. The method is selected from a group of several (ship, train, etc.). At this point, the program would allow the user to enter two different shipment methods because it is possible that the goods may be shipped by sea to a first location and then by train to their final destination. On the other hand, if one of the fields is date of delivery, the system may be configured to not allow two entries, but only one.

The hierarchy can be used to check for mutually exclusive text as well. For example, if text entered at a first level of the hierarchy is intended to be mutually exclusive with particular text entered into a lower level of the hierarchy, then entry of such text by the operator will result in an error indication at the time of processing, as more fully set forth below. A similar technique can be used to check for duplicate text at different levels of the hierarchy.

In general terms, the system can be thought of as an arrangement of a plurality of lists or levels, (i.e.; the hierarchy) where each list comprises one or more elements. Referring to FIG. 1, field 1 comprises a list of A1–A5 which is one list of five elements. Field 2 may be filled in with entries from any of the three lists B1–B2, C1–C3, and D1–D2. Similarly, Field 3 may be filled in with entries from either of the two lists E1–E3 or F1, and field four may be filled in with entries from either the list G1–G3, or the second list H1–H4. The entry of data from a list into a field dictates which list is required to be used for entry of data into a different field. The user may then choose the value from that list based upon the particulars of the transaction.

FIG. 2 shows, in conceptual form, the operation of the technique in conjunction with the information in fields 1–4 in FIG. 1. The actual input screens, as displayed on the personal computer, are described later herein. FIG. 2 is only meant to be a conceptual diagram which is useful for explanation.

In accordance with the inventive technique, the user enters in field 1 any of the list of values A1–A5. The user then fills into field 2 any of the values in groups 204–206, in field 3 any of the values in groups 207–208, and in field 4, any of the values contained within groups 211 through 213. As explained, the entry of particular data into a field defines from which group data entered into a different field must be chosen.

It is important to note that the term "data" includes, text data, numerals, amounts, etc. Moreover, in a conventional manner, different fields can be defined to accept only dates, only numerals, or other specified data. For example, the shipment term can be restricted to the items FOB, FAS, or other such industry accepted terms related to shipment. Moreover, such data can be entered in response to user defined instructions, questions, explanations, etc.

Returning to FIG. 2., when the entered data is to be saved and processed, the technique then executes the algorithm indicated by the interconnection between groups 201–213 and the arrows interconnecting them. It can be appreciated that the diagram of FIG. 2 is a hierarchy which ties the data (e.g.; text) at each level of the hierarchy to data or text at other levels of the hierarchy.

Specifically, if field 1 includes either A1 or A2, both from group 201, then the technique ensures that field 2 contains only one of two values, B1 or B2. This check is indicated by arrow 214 of FIG. 2. If the user, on the other hand, enters A3 into field 1, then the system ensures, via arrow 215, that one of C1–C3 of group 205 has been entered in field 2. Finally, with respect to field 1, if either A4 or A5 from group 203 are entered, then the system ensures that field 2 includes either D1 or D2 from group 206 as indicated by arrow 216.

This system of checking each level also ensures that the text entered at each level is in fact so entered. If, for example, an FOB term is entered, then the next level requires an insurance term to be entered. Moreover, other shipment terms are such that they do not allow an insurance term. In that case, the system will check among the various levels for "not allowed" terms to ensure that there are no insurance terms when such terms are not supposed to be present.

Proceeding to the next "level", if B1 is entered into field 2, then the system checks to ensure that one of the values from group 207, namely E1–E3 is entered into field 3 via arrow 217. If B2 is entered into field 2, then the system ensures that F1 from group 208 is entered into field 3 via arrow 218. Without going through every possible combination, it can be seen that each time an entry from the particular group of entries is entered into a particular field, the system triggers a check which ensures that one or more other fields include information from a particular other group. To return to the letter of credit example, A1–A5 may represent shipment terms, and B1–B2 may represent different types of insurance. As FIG. 2 shows, if either of shipment terms A1 or A2 are chosen by the user, then an insurance term must be chosen, where B1 and B2 represent the insurance terms. Of course, the invention is not limited to letters of credit and may be used in conjunction with any type of system for generating documents automatically.

Additionally, as with group 208, the system may also check to ensure that if an entry is present in a first field, a different field does not include any entry (see arrow 219). It is also noted that the elements A1–A5, B1–B2, etc. may actually include negatives. Specifically, if a particular entry is entered into field 1, the system may, for example, check to ensure that a particular different entry is not entered into field 2. For example, if the shipment term FOB is entered into field 1, the system would ensure that field 2 does not contain the terms of an insurance policy, because no insurance should be purchased for FOB shipments. The user would then be permitted to alter information previously entered.

Figure 3:
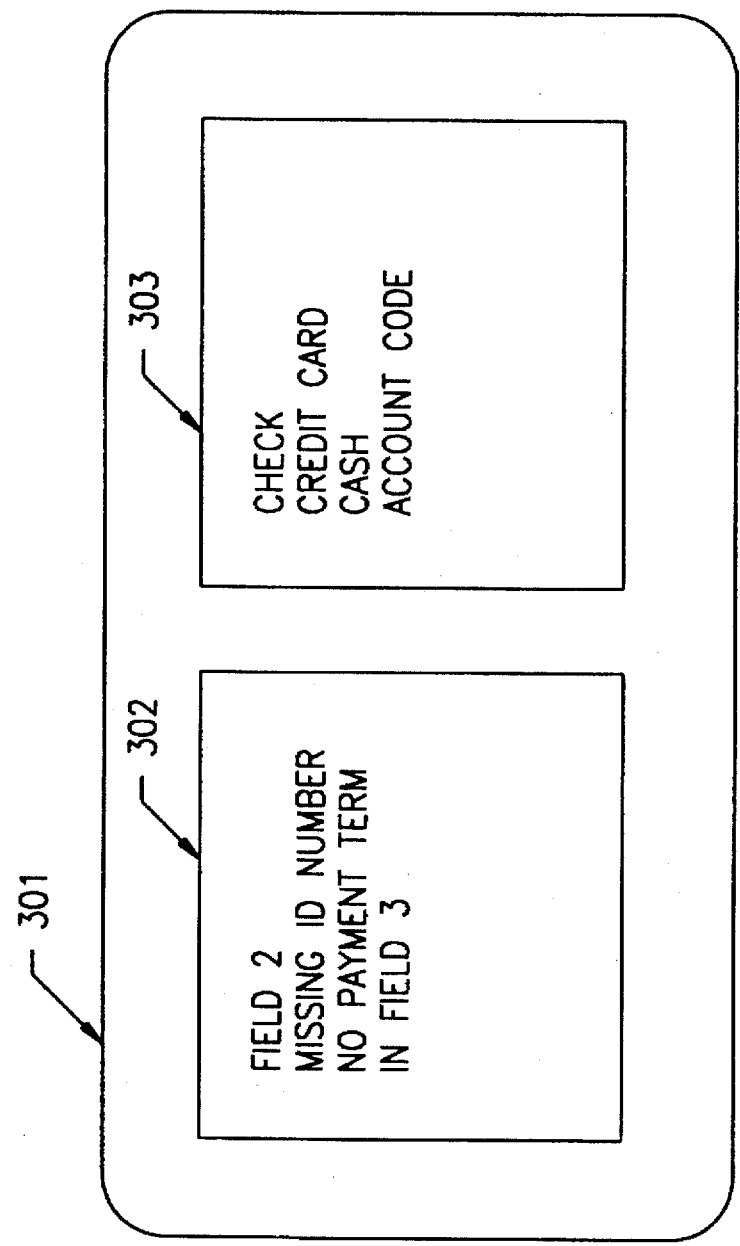
FIG. 3 shows a computer display after a transaction has been processed in accordance with the novel technique.

FIG. 3 shows a typical screen which may be presented on the user's personal computer after the data is entered and the transaction is processed. In the example of FIG. 3, personal computer screen 301 shows a first window 302 and the second window 303. Window 302 is a type of window which would be generated after data entry and processing of an exemplary transaction.

In the example of FIG. 3, the algorithm displayed in FIG. 2 has shown that there were two errors/inconsistencies in the data that was entered. Window 302 shows that field 2 is missing an ID number and that there is no payment term in field 3. The ID number and payment terms are examples of the types of terms which are contained in financial documents. The arrangement has checked all of the fields and based upon the algorithms described with respect to FIG. 2, has determined that both field 2 and field 3 have incorrect or inconsistent data contained therein. For example, field 1 may include an entry which requires field 2 to include an ID number. Since the user has not entered an ID number into field 2, the system flags the inconsistency and displays it to the user as shown in window 302. Additionally, window 302 shows that field 3 is missing a required term of payment.

The user may then "click" upon the first or second line of window 302. After the first or second line is selected, appropriate values appear in window 303. In the example shown at FIG. 3, the user has selected the second line. Since no payment term exists in field 3, four possible payment terms appear in window 303, any of which may be selected and "dragged" into field 3 using a mouse on a personal computer.

It is also noted that an override function may be built into the software. Specifically, when the user clicks upon the second line, four possible payment terms are presented to the user as shown in FIG. 303. The user may have the capability to override the software and permit a different payment term to be entered into field 3, or, may enter a command so that even though the absence of a payment term from field 3 would normally result in an error, this particular transaction is permitted to be processed without such payment term. Thus, the system may be used as a way of warning the user to check for possible inconsistencies, than allowing the user to process the transaction with the data entered by the user whether or not it is part of the group of permissible values.

Once all required information is entered by the user, and verified the technique may provide for printing and/or display of current or other versions of the completed document.

While the above describes the preferred embodiment of the invention, it will be apparent to those of ordinary skill of the art that other variation and modifications are apparent. For example, groups may overlap in that a first group may contain entries K1,K2,K3, and a second group may contain entries K3, K4, K5. Also, the checking can be done at the time the data is entered, rather than when the document is processed and saved. Audit trails of data entered/updated maintained for use by the system administrator. The important point is that through utilizing groups of linked lists and classifying the possible entries into groups, the system ensures that there are no inconsistencies in the document.

I claim:

1. A method of entering information into a database and ensuring that a computer generated transaction based upon said information is properly generated, the method comprising the steps of:

entering information into a first field, said information being selected from a plurality of possibilities, the possibilities being classified into predetermined groups;

entering data into a second field, said data to be entered into said second field being selected from a list of valid values for said second field;

determining, based upon said information entered into said first field, whether said second field can accept one entry from said list or plural entries from said list; and allowing, in response to said step of determining, either one or plural entries from said list to be entered into said second field depending upon a result of said step of determining.

2. The method of claim 1 wherein said list is displayed on a computer screen immediately subsequent to entry of said data into said first field.

3. The method of claim 2 wherein said data entered into said first field and said data entered into said second field is verified only after said transaction is processed and stored by the computer.

* * * * *